United States Patent
Egedal et al.

(10) Patent No.: US 11,428,207 B2
(45) Date of Patent: Aug. 30, 2022

(54) WIND TURBINE BLADE FLOW REGULATION

(71) Applicant: Siemens Gamesa Renewable Energy A/S, Brande (DK)

(72) Inventors: Per Egedal, Herning (DK); Peder Bay Enevoldsen, Vejle (DK); Moritz Fiedel, Hamburg (DE); Alejandro Gomez Gonzalez, Aarhus (DK); Gustav Hoegh, Vejle (DK); Mikkel Aggersbjerg Kristensen, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/311,009

(22) PCT Filed: Oct. 31, 2019

(86) PCT No.: PCT/EP2019/079830
§ 371 (c)(1),
(2) Date: Jun. 4, 2021

(87) PCT Pub. No.: WO2020/120014
PCT Pub. Date: Jun. 18, 2020

(65) Prior Publication Data
US 2022/0018329 A1 Jan. 20, 2022

(30) Foreign Application Priority Data
Dec. 13, 2018 (EP) .................................. 18212387

(51) Int. Cl.
*F03D 7/02* (2006.01)
*F03D 17/00* (2016.01)

(52) U.S. Cl.
CPC ............. *F03D 7/022* (2013.01); *F03D 17/00* (2016.05); *F05B 2240/306* (2020.08);
(Continued)

(58) Field of Classification Search
CPC .... F03D 7/022; F03D 17/00; F05B 2240/306; F05B 2240/3052; F05B 2260/80;
(Continued)

(56) References Cited

U.S. PATENT DOCUMENTS

| 4,692,095 | A | 9/1987 | Lawson-Tancred |
| 5,106,265 | A | 4/1992 | Holzem |

(Continued)

FOREIGN PATENT DOCUMENTS

| DE | 102015117032 A1 | 4/2017 |
| EP | 1320680 A1 | 6/2003 |

(Continued)

OTHER PUBLICATIONS

International Search Report and Written Opinion in corresponding PCT Patent Application No. PCT/EP2019/079830 dated Jan. 21, 2020. 12 pages.

(Continued)

*Primary Examiner* — David E Sosnowski
*Assistant Examiner* — Wayne A Lambert
(74) *Attorney, Agent, or Firm* — Schmeiser, Olsen & Watts LLP

(57) ABSTRACT

A wind turbine including:
 at least a rotor blade including an aerodynamic device for influencing the airflow flowing from the leading edge section of the rotor blade to the trailing edge section of the rotor blade, wherein the aerodynamic device is mounted at a surface of the rotor blade,
 an actuator of the aerodynamic device for actuating the aerodynamic device at least between a first protruded configuration and a second retracted configuration,
 a pressure supply system for operating the actuator by means of a pressurized fluid,
 an acoustic receiver for measuring an acoustic signal in the pressure supply system, and
(Continued)

a diagnostic unit connected to the acoustic receiver and configured for deriving an operative status of the aerodynamic device based on the acoustic signal, is provided.

14 Claims, 5 Drawing Sheets

(52) U.S. Cl.
CPC ..... *F05B 2260/80* (2013.01); *F05B 2270/333* (2013.01); *F05B 2270/806* (2013.01); *F05B 2270/81* (2013.01)

(58) Field of Classification Search
CPC .......... F05B 2270/333; F05B 2270/806; F05B 2270/81; Y02E 10/72
See application file for complete search history.

(56) References Cited

U.S. PATENT DOCUMENTS

| | | | | |
|---|---|---|---|---|
| 7,728,267 | B2* | 6/2010 | Sanderson | B64C 27/46 244/99.8 |
| 7,901,189 | B2* | 3/2011 | Gupta | F03D 1/0675 416/500 |
| 8,324,749 | B2* | 12/2012 | Minami | F03D 7/0224 290/55 |
| 8,327,710 | B2* | 12/2012 | Koste | F03D 80/30 416/61 |
| 8,851,840 | B2 | 10/2014 | Hancock et al. | |
| 2009/0097976 | A1* | 4/2009 | Driver | F03D 7/022 416/61 |
| 2012/0086209 | A1 | 4/2012 | Obrecht | |
| 2012/0141271 | A1 | 6/2012 | Southwick | |
| 2018/0058424 | A1 | 3/2018 | Egedal et al. | |
| 2019/0032641 | A1 | 1/2019 | Stoltenjohannes | |

FOREIGN PATENT DOCUMENTS

| | | |
|---|---|---|
| EP | 1623111 A1 | 2/2006 |
| EP | 2321528 A2 | 5/2011 |
| EP | 2679808 A1 | 1/2014 |
| EP | 3290688 A1 | 3/2018 |
| EP | 3577338 A1 | 12/2019 |
| EP | 3577339 A1 | 12/2019 |
| EP | 3667063 A1 | 6/2020 |
| FR | 2290585 A1 | 6/1976 |
| WO | 2010023278 A2 | 3/2010 |
| WO | 2018041420 A1 | 3/2018 |
| WO | 2018162102 A1 | 9/2018 |

OTHER PUBLICATIONS

Extended European Search Report in corresponding European Application No. 18212387.7 dated Jul. 8, 2019. 6 pages.

* cited by examiner

WIND TURBINE BLADE FLOW REGULATION

CROSS-REFERENCE TO RELATED APPLICATIONS

This application is a national stage entry of PCT Application No. PCT/EP2019/079830 having a filing date of Oct. 31, 2019, which claims priority to European Patent Application No. 18212387.7, having a filing date of Dec. 13, 2018, the entire contents of which are hereby incorporated by reference.

FIELD OF TECHNOLOGY

The following relates to a method for detecting the status in an aerodynamic device for regulating the flow on the surface of a blade for a wind turbine. The present invention further relates to a wind turbine including control devices for regulating the flow on the surface of a blade for a wind turbine and detecting the status aerodynamic device for regulating such flow.

BACKGROUND

A wind turbine rotor blade may have installed a flow regulating device on its surface, which flows from the leading edge to the trailing edge of a rotor blade of a wind turbine. An example of such a flow regulating device is a vortex generator (VG) installed on the suction side of the wind turbine rotor blade. In general, a flow regulating device may be considered to comprise a device which is capable of enhancing the lift coefficient of the aerofoil section, for example by increasing the level of energy of the boundary layer of the rotor blade.

Other aerodynamic devices may act in concert with the vortex generator and may influence the effect of the vortex generator depending on the state of the spoiler. Examples of the latter aerodynamic device are typically spoilers, installed on the suction side of the blade, between the trailing edge and the vortex generator. Alternatively, spoilers may be present alone, i.e. not combined with vortex generators or other flow regulating devices. Spoilers may be configured such that its shape and/or orientation can be regulated, e.g. by a pneumatic or hydraulic or mechanical actuator.

The spoiler may act in concert with the vortex generator and may influence the effect of the vortex generator depending on the state of the spoiler, i.e. a protrusion height and/or tilt angle by which the spoiler extends from or is tilted relative to other surface portions of the rotor blade.

EP 1 623 111 B1 discloses a wind turbine blade including adjustable lift-regulating means arranged on or at the surface of the wind turbine blade and extending in the longitudinal direction of the blade and an activation means by which the lift-regulating means can be adjusted and thus alter the aerodynamic properties of the blade. The lift-regulating means comprise one or more flexible flaps.

U.S. Pat. No. 8,851,840 B2 discloses a wind turbine blade comprising a blade body and a device for modifying the aerodynamic surface or shape of the blade, wherein a pneumatic actuator controls the position and/or movement of the device, wherein a pressure chamber positioned within the blade body is present. The pressure chamber may be pressurized thereby changing the state of the device, thereby modifying the aerodynamic surface or shape of the blade.

U.S. Pat. No. 5,106,265 A discloses a wind turbine wing comprising a pneumatically actuated spoiler movable perpendicular to an airstream.

WO 2018/041420 disclose a rotor blade comprising an aerodynamic device for influencing the air flow flowing from the leading edge section of the rotor blade to the trailing edge section of the rotor blade, wherein the aerodynamic device is mounted at a surface of the rotor blade and comprises a pneumatic or hydraulic actuator, such as a hose or a cavity of which the volume depends on the pressure of the fluid being present inside the pneumatic or hydraulic actuator.

EP 2 679 808 A1 shows a general description of the noise profile (frequency content) changing when the aerodynamic device is activated.

It is desirable to monitor the performance of the spoilers or other flow regulating aerodynamic devices regulated by a pneumatic or hydraulic actuator and their influence on the wind turbine power production.

SUMMARY

According to a first aspect of the present invention, it is provided a wind turbine including:
at least a rotor blade comprising an aerodynamic device for influencing the airflow flowing from the leading edge section of the rotor blade to the trailing edge section of the rotor blade, wherein the aerodynamic device is mounted at a surface of the rotor blade, an actuator of the aerodynamic device for actuating the aerodynamic device at least between a first protruded configuration and a second retracted configuration, a pressure supply system for operating the actuator by means of a pressurized fluid, an acoustic receiver for measuring an acoustic signal in the pressure supply system, and a diagnostic unit connected to the acoustic receiver and configured for deriving an operative status of the aerodynamic device based on the acoustic signal.

According to a second aspect of the present invention, it is provided a method for detecting the operative status of an aerodynamic device for influencing the airflow flowing from the leading edge of a rotor blade for a wind turbine to the trailing edge of the rotor blade, the aerodynamic device being movable by an actuator between a first protruded configuration and a second retracted configuration by means of a pressurized fluid, the method comprising the steps of:
measuring an acoustic signal in the pressure supply system, and
deriving an operative status of the aerodynamic device based on the acoustic signal.

The above described arrangement and method allow monitoring the performance and status of the aerodynamic device and therefore their influence on the wind turbine power production.

Advantageously, the actuator may be a pneumatic hose connected to the pressure supply system. The pressure supply system operates the actuator by controlling the pressure in the pressurized fluid.

According to embodiments of the present invention, the actuator, the pressure supply system, the acoustic receiver and the diagnostic unit are integrated in a rotor blade of the wind turbine.

According to embodiments of the present invention, the wind turbine comprises an acoustic transmitter for transmitting the acoustic signal in the pressure supply system, the acoustic transmitter being connected to the diagnostic unit.

The actuator may be operated between an inflated configuration corresponding to the first protruded configuration of the aerodynamic device and a deflated configuration corresponding to the second retracted configuration of the aerodynamic device, the actuator in the inflated configuration providing a first path for the acoustic signal in the pressure supply system, the actuator in the deflated configuration providing a second path for the acoustic signal in the pressure supply system, the second path being different from the first path.

According to an embodiment of the present invention, the pressure supply system comprises a first pressure line for providing the pressurized fluid to the actuator of the aerodynamic device, the acoustic transmitter and the acoustic receiver being provided at the first pressure line.

According to such embodiment, the diagnostic unit is a sonar control unit, the acoustic transmitter is a loudspeaker connected to the sonar control unit and the acoustic receiver is a microphone also connected to the sonar control unit.

According to such embodiment, the loudspeaker injects a sound pulse into the pressure line. A microphone detects the echo. If the actuator is in the inflated configuration, the sound pulse travels to the end of the actuator before it echoes back to the microphone. If the actuator is in the deflated configuration the sound pulse is returned already at the end of the pressure line, i.e. at the closed port of the expander actuator. If the echo time is short, the actuator is in the deflated configuration; if the echo time is long, the actuator is in the inflated configuration.

Advantageously, a sonar solution is failsafe; because in case there is a failure in the sonar system itself no echo is received.

According to an embodiment of the present invention, a monitoring unit may be associated to the diagnostic unit for raising an alarm in case the received echo is not as expected.

According to an embodiment of the present invention, the pressure supply system comprises a second pressure return line for receiving the pressurized fluid from the actuator of the aerodynamic device, the acoustic receiver being provided at the second pressure return line.

According to such embodiment, the loudspeaker injects a sound pulse into the pressure line. The microphone is placed at the end of a return pressure line connected to the back end of the actuator. If the actuator is in the inflated configuration, the sound pulse travels all the way to the microphone. If the actuator is in the deflated configuration, the sound pulse stops at the end of the pressure line, i.e. at the beginning of the actuator.

If a sound pulse is received, the actuator is in the inflated configuration and if no sound pulse is received, the actuator is in the deflated configuration.

This information can be compared with the expected state of the trim stall section, and if there are deviations, an alarm is to be raised.

According to an embodiment of the present invention, no acoustic transmitter is present, but the acoustic source is provided by the wind acting on the aerodynamic device and propagating to the pneumatic actuator in the inflated configuration.

In such embodiment the diagnostic unit may be configured for calculating a frequency spectrum of the acoustic signal and deriving an operative status of the aerodynamic device based on the frequency spectrum.

Such embodiment of the present invention is based on the fact that aerodynamic device in the protruded configuration is subject to forces caused by the airflow around the blade. When stall will is generated the frequency of the stalled airflow propagates to the aerodynamic device and from there into the pneumatic actuator and the pressurized air used to actuate it. The vibration of this can be picked up by a microphone connected to the hose or directly as a vibration measurement on the section. If the aerodynamic device is in the retracted configuration, then these forces are must smaller and have different frequency content.

According to an embodiment of the present invention, the first pressure line extends between a first end where the acoustic receiver and/or the acoustic transmitter are provided and a second end connected to the actuator of the aerodynamic device, a sound absorption device being provided at the first end for acoustically isolating the first pressure line from acoustical noise generated in the pressure supply system.

Advantageously, the sound absorption material avoids that noise and echo from the pressure supply system reaches the pressure line.

It should be understood that features which have individually or in any combination been disclosed, described or provided for a method for detecting the operative status of an aerodynamic device may also, individually or in any combination applied for or provided for an arrangement for detecting the operative status of an aerodynamic device in a wind turbine (in particular comprised in a blade for a wind turbine) according to embodiments of the present invention and vice versa The aspects defined above and further aspects of the present invention are apparent from the examples of embodiment to be described hereinafter and are explained with reference to the examples of embodiment. The present invention will be described in more detail hereinafter with reference to examples of embodiment but to which the present invention is not limited.

BRIEF DESCRIPTION

Some of the embodiments will be described in detail, with reference to the following figures, wherein like designations denote like members, wherein.

DETAILED DESCRIPTION

The drawings are in schematic form. Similar or identical elements are referenced by the same or different reference signs.

Figure 1:
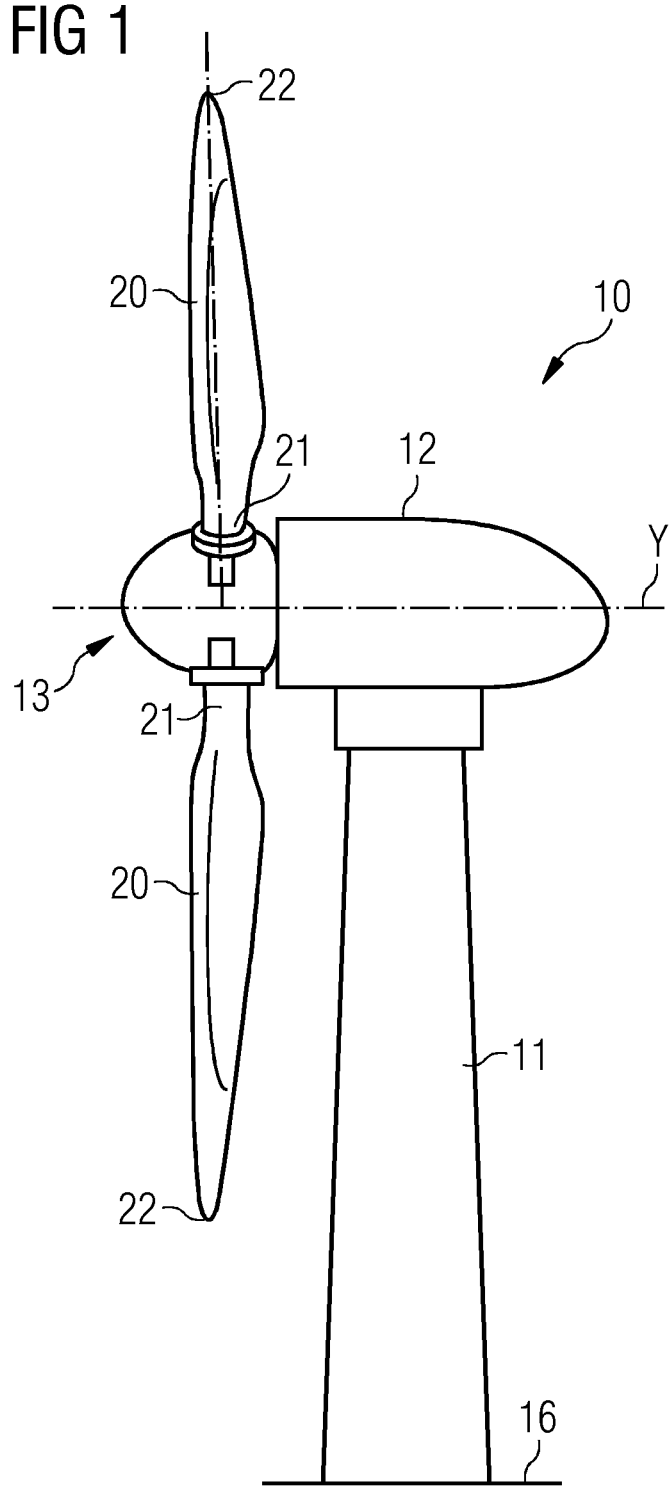
FIG. 1 depicts a wind turbine.

FIG. 1 shows a conventional wind turbine 10 for generating electricity. The wind turbine 10 comprises a tower 11 which is mounted on the ground 16 at one end. At the opposite end of the tower 11 there is mounted a nacelle 12. The nacelle 12 is usually mounted rotatable with regard to the tower 11, which is referred to as comprising a yaw axis substantially perpendicular to the ground 16. The nacelle 12 usually accommodates the generator of the wind turbine and the gear box (if the wind turbine is a geared wind turbine). Furthermore, the wind turbine 10 comprises a hub 13 which is rotatable about a rotor axis Y. When not differently specified, the terms axial, radial and circumferential in the following are made with reference to the rotor axis Y.

The hub 13 is often described as being a part of a wind turbine rotor, wherein the wind turbine rotor is capable to rotate about the rotor axis Y and to transfer the rotational energy to an electrical generator (not shown).

The wind turbine 1 further comprises at least one blade 20 (in the embodiment of FIG. 1, the wind rotor comprises three blades 20, of which only two blades 20 are visible) mounted on the hub 13. The blades 4 extend substantially radially with respect to the rotational axis Y.

Each rotor blade 20 is usually mounted pivotable to the hub 13, in order to be pitched about respective pitch axes X. This improves the control of the wind turbine and in particular of the rotor blades by the possibility of modifying the direction at which the wind is hitting the rotor blades 20. Each rotor blade 20 is mounted to the hub 13 at its root section 21. The root section 21 is opposed to the tip section 22 of the rotor blade.

Figure 2:
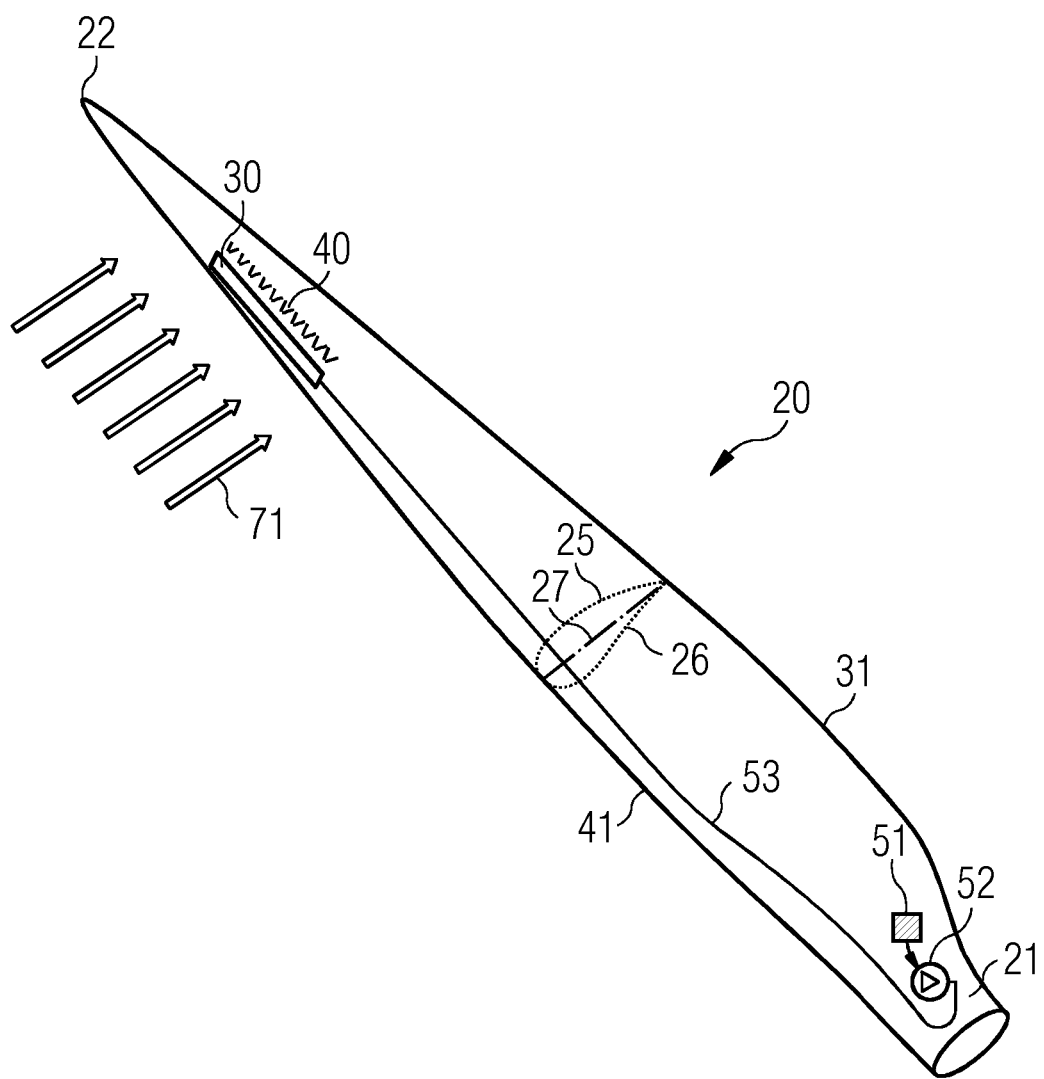
FIG. 2 depicts a rotor blade of a wind turbine including an aerodynamic device.

FIG. 2 illustrates the rotor blade 20 comprising an aerodynamic device 30 in the form of an actuated spoiler. Between the root section 21 and the tip section 22 the rotor blade 20 furthermore comprises a plurality of aerofoil sections for generating lift. Each aerofoil section comprises a suction side 25 and a pressure side 26. The aerofoil shape of the aerofoil portion is symbolized by one aerofoil profile which is shown in FIG. 2 and which illustrates the cross-sectional shape of the rotor blade at this spanwise position. Also note that the suction side 25 is divided or separated from the pressure side 26 by a chord line 27 which connects a leading edge 41 with a trailing edge 31 of the rotor blade 20.

The aerodynamic device 30 is arranged on the suction side 25 between the leading edge 41 and the trailing edge 31.

The aerodynamic device 30 in FIG. 2 is movable by means of a pressure line 53 connected to a pneumatic actuator 34. According to the embodiment of the attached figures, the pneumatic actuator 34 is realized as a hose. The hose 34 comprises an elastic outer skin, such that it can inflate and deflate reversibly and during many cycles when operated by means of the pressure line 53.

The pressure line 53 is comprised in a pressure supply system 52, controlled by a control unit 51. The pressure supply system 52 provides pressurized air, for example pressurized air or other pressurized gas, to the pneumatic actuator 34. In this context, the term "pressurized fluid" not only implies positive pressure but also negative pressure, wherein fluid is sucked (or "drawn") out of the pneumatic actuator 34. The pressure line 53 could be in practice realized as tubes or pipes which do not significantly change their volume. Finally, the control unit 51 is responsible for setting a specific pressure at the pressure supply system 52 which subsequently leads to a certain predetermined pressure at the pneumatic actuator 34. By controlling the pressure of the pressurized air the pneumatic actuator 34 is operated between an inflated and a deflated configuration.

In the example shown in FIG. 2, the control unit 51 and the pressure supply system 52 are located in the root section 21 of the rotor blade 20. According to other embodiments of the present invention (not shown in the attached figures), these parts could also be placed elsewhere in the wind turbine, such as e.g. in the hub 13 of the wind turbine 10.

The rotor blade 20 additionally comprises a flow regulating unit 40 comprising multiple pairs of vortex generators.

The flow regulating unit 40 are arranged on the suction side 25 of the blade 20 between the aerodynamic device 30 and the the trailing edge 31.

According to other embodiments of the present invention (not shown in the attached figures), the flow regulating unit 40 are arranged on the suction side 25 of the blade 20 between the leading edge 41 and the aerodynamic device 30.

According to other embodiments of the present invention (not shown in the attached figures), the flow regulating unit 40 are not present and only the aerodynamic device 30 is used to regulate the flow on the surface of the blade 20.

According to other embodiments of the present invention (not shown in the attached figures), the blade 20 comprises a plurality of aerodynamic devices 30.

Figure 3:
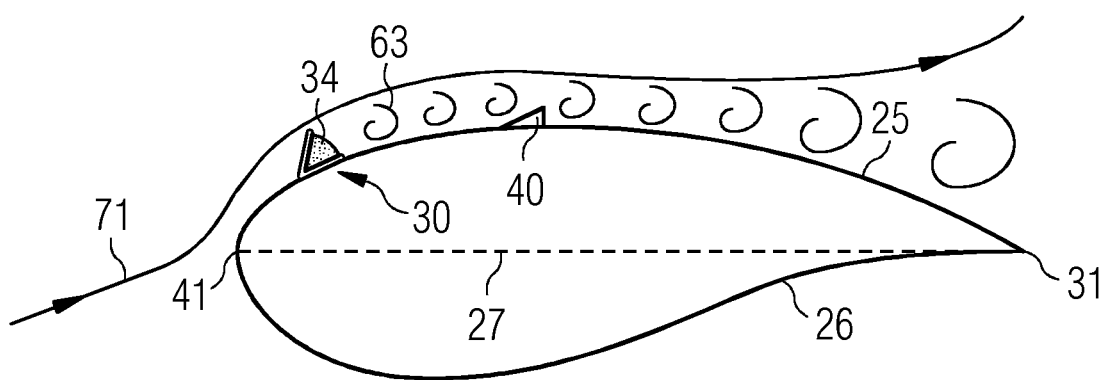
FIG. 3 depicts a radial section of the rotor blade of FIG. 2.

FIG. 3 shows the aerodynamic device 30 in a first protruded configuration, corresponding to an inflated configuration of the pneumatic actuator 34.

In the first configuration the aerodynamic device 30 deviates the airflow 71 which is flowing from the leading edge 41 to the trailing edge 31 of the rotor blade.

The aerodynamic device 30 in the first protruded configuration induces stall. This is visualized with relatively large vortices 63 downstream of the aerodynamic device 30. A consequence of the induced stall is a decrease in lift of the rotor blade and, consequently, a reduced loading of the rotor blade and related components of the wind turbine.

Figure 4:
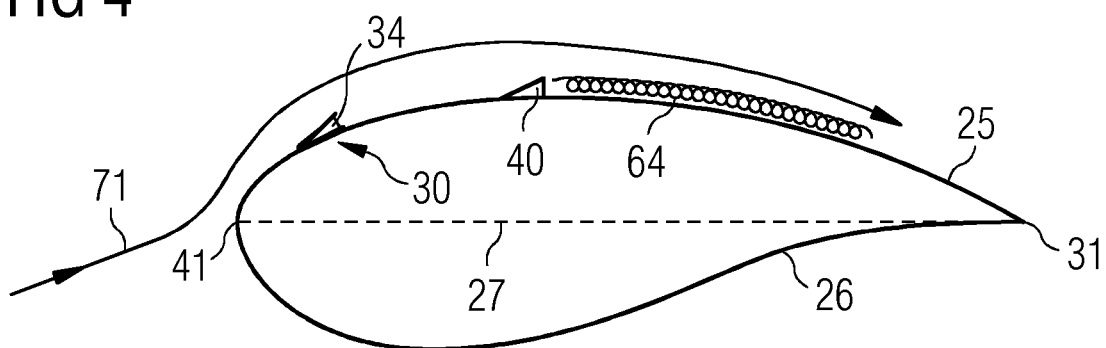
FIG. 4 depicts a radial section of the rotor blade of FIG. 2.

FIG. 4 shows the aerodynamic device 30 in a second retracted configuration, i.e. moved downwards towards the surface of the rotor blade 20, corresponding to a deflated configuration of the pneumatic actuator 34.

In this second configuration, the airflow 71 flowing across the aerodynamic device 30 remains attached to the surface of the rotor blade 20, thus that no flow separation, i.e. stall, occurs. As a consequence, the lift of the rotor blade increases. Re-energizing vortices 64 are generated in the boundary layer by the vortex generators 40, which have the effect of helping increasing the lift. As a result, the highest lift values can be achieved.

By operating the pneumatic actuator 34 of the aerodynamic device 30 through the pressure line 53, the aerodynamic device 30 can be moved between the first protruded configuration and the second retracted configuration in order to vary the aerodynamic properties of the blade as desired and requested when operating the wind turbine 10.

Figure 5:
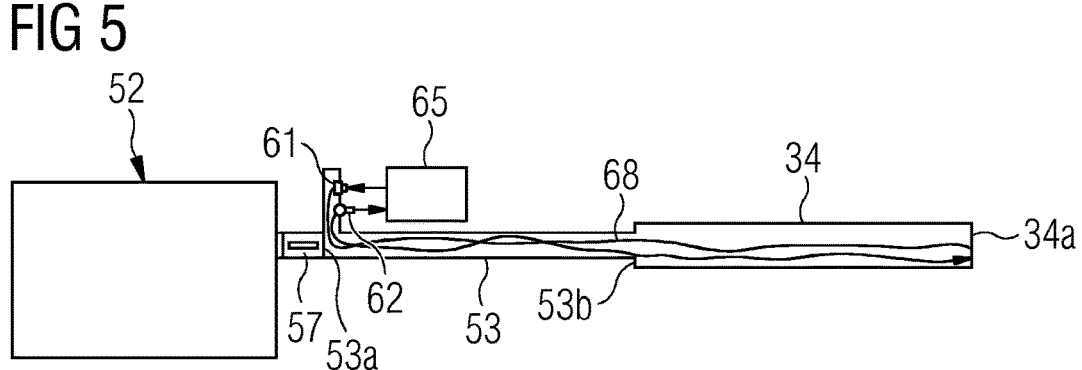
FIG. 5 depicts schematically a pneumatic arrangement according to a first embodiment of the present invention.

FIG. 5 schematically shows the pressure line 53 of the pressure supply system 52 connected to the pneumatic actuator 34 in the inflated configuration, to which corresponds the first protruded configuration of the aerodynamic device 30 (not shown in FIG. 5). The pressure line 53 extends between a first end 53a, where an acoustic transmitter 61 and an acoustic receiver 62 are provided, and a second end 53b connected to the pneumatic actuator 34 of the aerodynamic device 30. A sound absorption device 57 is provided at the first end 53a for acoustically isolating the first pressure line 53 from acoustical noise generated in other sections of the pressure supply system 52 not included in the first pressure line 53.

The acoustic transmitter 61 and the acoustic receiver 62 are connected to a diagnostic unit 65.

According to embodiments of the present invention, the acoustic transmitter 61 is a loudspeaker and the acoustic receiver 62 is a microphone.

According to embodiments of the present invention, the diagnostic unit 65 is a sonar control unit.

The first pressure line 53 and the actuator 34 in the inflated configuration provide a first path 68 for the acoustic signal. The first path 68 extends from the acoustic transmitter 61 through the first pressure line 53 through the second end 53b, up to a blind end 34a of the pneumatic actuator 34 and back towards the acoustic receiver 62.

Figure 6:
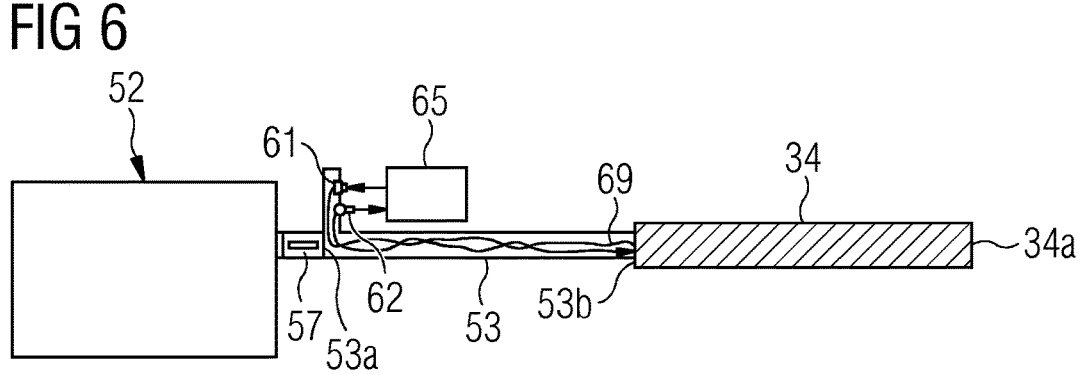
FIG. 6 depicts schematically a pneumatic arrangement according to a first embodiment of the present invention.

FIG. 6 shows the same scheme of FIG. 5, where the pneumatic actuator 34 is in the deflated configuration, to which corresponds the second retracted configuration of the aerodynamic device 30 (not shown in FIG. 6). Consequently, a second path 69 shorter than the first path 68 is provided for the acoustic signal. The second path 69 extends from the acoustic transmitter 61 through the first pressure line 53 up to the second end 53b and back towards the acoustic receiver 62.

The diagnostic unit 65 is configured for deriving the operative status of the aerodynamic device 30 based on the analysis of the acoustic signal.

By measuring the time between the emission of an acoustic signal from the acoustic transmitter 61 and the reception of such signal by the acoustic receiver 62, the diagnostic unit 65 can derive if the pneumatic actuator 34 is in the inflated configuration (FIG. 5) or in the deflated configuration (FIG. 6). Consequently, the diagnostic unit 65 can derive if the aerodynamic device 30 is in the first protruded configuration or in the second retracted configuration.

The analysis of the diagnostic unit 65 may be based on the comparison between the measured acoustic signal, in particular the measure time between emitted and received signal, and a desired acoustic signal, in particular the expected times between emitted and received signal when the pneumatic actuator 34 is in the inflated configuration or in the deflated configuration.

If the measured time does not correspond to the expected time, for example a time corresponding to a deflated configuration when an inflated configuration has been commanded through the pressure supply system 52 or vice versa, a failure of the pneumatic actuator 34 or of the aerodynamic device 30 is detected.

Figure 7:
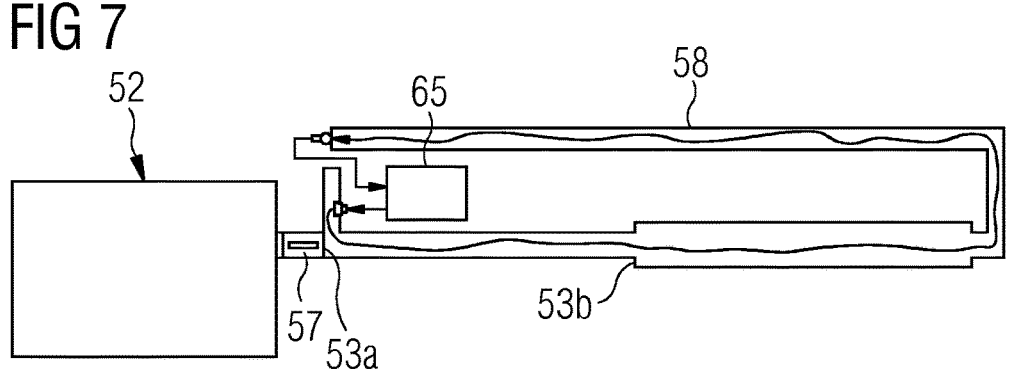
FIG. 7 depicts schematically a pneumatic arrangement according to a second embodiment of the present invention.

FIG. 7 schematically shows another embodiment of the pressure supply system 52. The pressure line 53 of the pressure supply system 52 is connected to the pneumatic actuator 34 in the inflated configuration, to which corresponds the first protruded configuration of the aerodynamic device 30 (not shown in FIG. 7). The pressure line 53 extends between a first end 53a, where an acoustic transmitter 61 is provided, and a second end 53b connected to the pneumatic actuator 34 of the aerodynamic device 30. A sound absorption device 57 is provided at the first end 53a for acoustically isolating the first pressure line 53 from acoustical noise generated in other sections of the pressure supply system 52 not included in the first pressure line 53.

The pressure supply system 52 includes a second pressure return line 58 for receiving the pressurized fluid from pneumatic actuator 34. The acoustic receiver 62 is provided at an end of the second pressure return line 58, opposite to the pneumatic actuator 34.

The acoustic transmitter 61 and the acoustic receiver 62 are connected to a diagnostic unit 65.

The first pressure line 53, the actuator 34 in the inflated configuration and the second pressure return line 58 provide a path for the acoustic signal from the acoustic transmitter 61 to the acoustic receiver 62.

Figure 8:
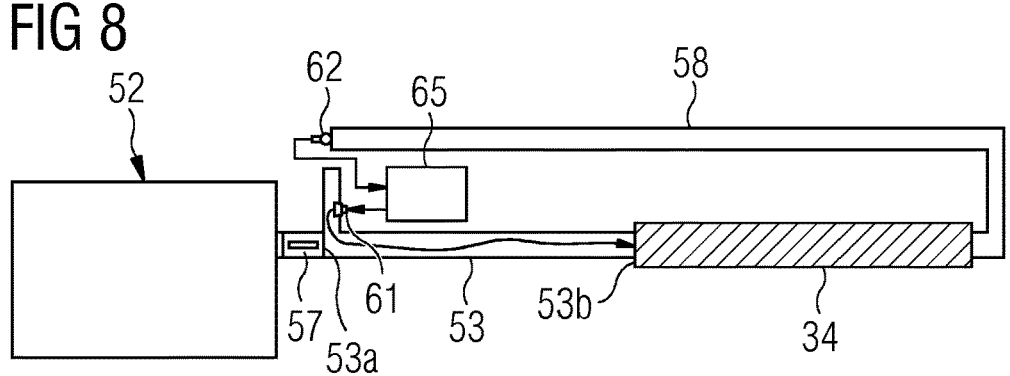
FIG. 8 depicts schematically a pneumatic arrangement according to a second embodiment of the present invention.

FIG. 8 shows the same scheme of FIG. 7, where the pneumatic actuator 34 is in the deflated configuration, to which corresponds the second retracted configuration of the aerodynamic device 30 (not shown in FIG. 6). Consequently, the path from the acoustic transmitter 61 to the acoustic receiver 62 is interrupted and an acoustic signal emitted from the acoustic transmitter 61 cannot be received by the acoustic receiver 62.

By detecting if the acoustic signal reaches the acoustic receiver 62 or not, the diagnostic unit 65 can derive if the pneumatic actuator 34 is in the inflated configuration (FIG. 7) or in the deflated configuration (FIG. 8). Consequently, the diagnostic unit 65 can derive if the aerodynamic device 30 is in the first protruded configuration or in the second retracted configuration.

If such detection does not correspond to the expected one, for example a deflated configuration is detected when an inflated configuration has been commanded through the pressure supply system 52 or vice versa, a failure of the pneumatic actuator 34 or of the aerodynamic device 30 is detected.

Figure 9:
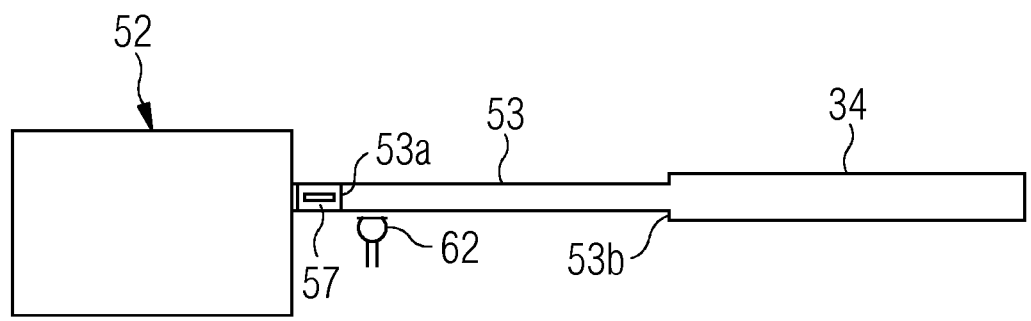
FIG. 9 depicts schematically a pneumatic arrangement according to a third embodiment of the present invention.

FIG. 9 schematically shows the pressure line 53 of the pressure supply system 52 connected to the pneumatic actuator 34 in the inflated configuration, to which corresponds the first protruded configuration of the aerodynamic device 30 (not shown in FIG. 9). The pressure line 53 extends between a first end 53a, where an acoustic receiver 62 is provided, and a second end 53b connected to the pneumatic actuator 34 of the aerodynamic device 30. A sound absorption device 57 is provided at the first end 53a for acoustically isolating the first pressure line 53 from acoustical noise generated in other sections of the pressure supply system 52 not included in the first pressure line 53.

The acoustic receiver 62 is connected to a diagnostic unit (not shown).

According to embodiments of the present invention, the acoustic receiver 62 is a microphone.

In such embodiment an acoustic source is provided by the wind acting on the aerodynamic device 30 and propagating to the pneumatic actuator 34 in the inflated configuration.

In the present embodiment the diagnostic unit is configured for calculating a frequency spectrum of the acoustic signal and deriving an operative status of the aerodynamic device 30 based on the frequency spectrum.

The analysis of the diagnostic unit 65 is based on the comparison between the frequency spectrum of measured acoustic signal and a desired frequency spectrum, in particular the expected frequency spectrum when the pneumatic actuator 34 is in the inflated configuration or in the deflated configuration.

If the measured frequency spectrum does not correspond to the expected frequency spectrum, for example a frequency spectrum corresponding to a deflated configuration when an inflated configuration has been commanded through the pressure supply system 52 or vice versa, a failure of the pneumatic actuator 34 or of the aerodynamic device 30 is detected.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A wind turbine comprising:
    a rotor blade comprising an aerodynamic device for influencing an airflow flowing from a leading edge section of the rotor blade to a trailing edge section of the rotor blade, wherein the aerodynamic device is mounted at a surface of the rotor blade;
    an actuator of the aerodynamic device for actuating the aerodynamic device at least between a first protruded configuration and a second retracted configuration;
    a pressure supply system for operating the actuator by means of a pressurized fluid;
    an acoustic receiver for measuring an acoustic signal in the pressure supply system; and
    a diagnostic unit connected to the acoustic receiver and configured for deriving an operative status of the aerodynamic device based on the acoustic signal.

2. The wind turbine according to claim 1, wherein the wind turbine comprises an acoustic transmitter for transmitting the acoustic signal in the pressure supply system, the acoustic transmitter being connected to the diagnostic unit.

3. The wind turbine according to claim 1, wherein the actuator is operated between an inflated configuration corresponding to the first protruded configuration of the aerodynamic device and a deflated configuration corresponding to the second retracted configuration of the aerodynamic device, the actuator in the inflated configuration providing a first path for the acoustic signal in the pressure supply system, the actuator in the deflated configuration providing a second path for the acoustic signal in the pressure supply system, the second path being different from the first path.

4. The wind turbine according to claim 2, wherein the pressure supply system comprises at least a first pressure line for providing the pressurized fluid to the actuator of the aerodynamic device, the acoustic transmitter being provided at the first pressure line.

5. The wind turbine according to claim 4, wherein the pressure supply system comprises at least a second pressure return line for receiving the pressurized fluid from the actuator of the aerodynamic device, the acoustic receiver being provided at the second pressure return line.

6. The wind turbine according to claim 4, wherein the first pressure line extends between a first end where the acoustic receiver and/or the acoustic transmitter are provided and a second end connected to the actuator of the aerodynamic device, a sound absorption device being provided at the first end for acoustically isolating the first pressure line from acoustical noise generated in the pressure supply system.

7. The wind turbine according to claim 1, wherein the actuator is an inflatable hose.

8. The wind turbine according to claim 1, wherein the acoustic receiver is a microphone.

9. The wind turbine according to claim 2, wherein the acoustic transmitter is a loudspeaker.

10. A rotor blade for a wind turbine comprising:
    an aerodynamic device for influencing an airflow flowing from a leading edge section of the rotor blade to a trailing edge section of the rotor blade, wherein the aerodynamic device is mounted at a surface of the rotor blade;
    an actuator of the aerodynamic device for actuating the aerodynamic device at least between a first protruded configuration and a second retracted configuration;
    a pressure supply system for operating the actuator by means of a pressurized fluid;
    an acoustic receiver for measuring an acoustic signal in the pressure supply system; and
    a diagnostic unit connected to the acoustic receiver and configured for deriving an operative status of the aerodynamic device based on the acoustic signal.

11. A method for detecting an operative status of an aerodynamic device for influencing an airflow flowing from a leading edge of a rotor blade for a wind turbine to a trailing edge of the rotor blade, the aerodynamic device being movable by an actuator between a first protruded configuration and a second retracted configuration by means of a pressurized fluid, the method comprising:
    measuring an acoustic signal in a pressure supply system; and
    deriving the operative status of the aerodynamic device based on the acoustic signal.

12. The method according to claim 11, wherein the acoustic signal is compared with a desired acoustic signal, the operative status of the aerodynamic device being derived based on the comparison between the measured acoustic signal and the desired acoustic signal.

13. The method according to claim 11, the operative status of the aerodynamic device being derived based on a time between an emission of the acoustic signal and a reception of the acoustic signal.

14. The method according to claim 11, further comprising:
    calculating a frequency spectrum of the acoustic signal; and
    deriving the operative status of the aerodynamic device based on the frequency spectrum.

* * * * *